(12) United States Patent
Endo

(10) Patent No.: US 6,645,894 B2
(45) Date of Patent: Nov. 11, 2003

(54) OPTICAL GLASS AND OPTICAL PART

(75) Inventor: Michio Endo, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/106,821

(22) Filed: Mar. 27, 2002

(65) Prior Publication Data

US 2003/0032542 A1 Feb. 13, 2003

(30) Foreign Application Priority Data

Mar. 27, 2001 (JP) .......................... 2001-089909

(51) Int. Cl.[7] .................. C03C 3/155; C03C 3/66; C03C 3/15
(52) U.S. Cl. ................. 501/51; 501/79; 501/50; 501/78; 501/901
(58) Field of Search ............... 501/49, 50, 51, 501/77, 78, 79, 901

(56) References Cited

U.S. PATENT DOCUMENTS 3,958,999 A * 5/1976 Izumitani et al. .......... 501/51
4,166,746 A * 9/1979 Ishibashi et al. .......... 501/42

FOREIGN PATENT DOCUMENTS

| DE | 3102690 A1 | * | 8/1982 | ............ C03C/3/14 |
| GB | 2106497 A | * | 4/1983 | ............ C03C/3/14 |
| JP | 50-6326 B | | 7/1971 | |
| JP | 55116641 A | * | 9/1980 | ............ C03C/3/30 |

OTHER PUBLICATIONS

Derwent Abstract 1980–75777C, Abstract of Kimura et al. JP 55–116641.*

Derwent Abstract 1982–72496E, Abstract of Geiler et al. DE 31 02 690.*

* cited by examiner

Primary Examiner—David Sample
Assistant Examiner—Elizabeth Bolden
(74) Attorney, Agent, or Firm—Nixon & Vanderhye P.C.

(57) ABSTRACT

An optical glass that substantially does not contain any $Ta_2O_5$ and has high-refractivity low-dispersion optical properties and various optical parts made of such optical glass are provided stably at a low cost, and an optical part made thereof is provided, the optical glass having a glass composition comprising, by weight %, 0 to 7% of $SiO_2$, 18 to 30% of $B_2O_3$, provided that the total content of $SiO_2$ and $B_2O_3$ is 23 to 35%, 2 to 10% of ZnO, 30 to 50% of $La_2O_3$, 0 to 20% of $Gd_2O_3$, 0 to 20% of $Y_2O_3$, provided that the total content of $La_2O_3$, $Gd_2O_3$ and $Y_2O_3$ is 45 to 60%, 3 to 8% of $ZrO_2$ and 3 to 12% of $Nb_2O_5$, the total content of these components being at least 95% by weight, the optical glass having a refractive index [nd] and an Abbe's number [vd] which satisfy specified relational expressions.

6 Claims, 2 Drawing Sheets

OPTICAL GLASS AND OPTICAL PART

FIELD OF THE INVENTION

The present invention relates to an optical glass and an optical part made of the optical glass. More specifically, it relates to an optical glass that substantially does not contain any $Ta_2O_5$ and has high-refractivity low-dispersion optical properties, and various optical parts made of such optical glass.

PRIOR ART OF THE INVENTION

With the spread of digital cameras, demands for small-sized lenses are more and more increasing in recent years. A high-refractivity low-dispersion glass is suitable as an optical glass material for producing such small-sized lenses, and demands for the high-refractivity low-dispersion glass are therefore increasing as well.

The glass of the above type, for example, an optical glass having a refractive index [nd] of at least 1.8 and an Abbe's number [vd] of at least 41 contains a large amount of lanthanoids and high-valance components such as $Nb_2O_5$ and $Ta_2O_5$ that will produce a high refractive index and low dispersion, as is described in JP-B-50-6326.

Tantalum is used as a raw material for $Ta_2O_5$ that plays an important role in the above optical glass. Not only the existing amount of the tantalum is small, but also the tantalum is used as a material for a tantalum electrolytic capacitor for use as a part for a cellular phone, and demands for tantalum are therefore increasing with the spread of cellular phones. The price of the tantalum is hence increasing. Under the circumstances, it is therefore difficult to stably provide a large amount of a high-refractivity low-dispersion glass containing a large amount of $Ta_2O_5$.

Besides the aspect of the above raw material supply, $Ta_2O_5$ intensely works to increase the glass transition temperature [Tg], so that it is required to increase the annealing temperature in a production process. As a result, there is caused problem that the lifetime of an annealing furnace is decreased or that it is made difficult to carry out the continuous operation of the furnace for a long period of time. Moreover, the energy consumption for the annealing is inevitably increased. Further, since a glass of the above type contains a smaller amount of oxides forming a glass network such as $SiO_2$ and $B_2O_3$, the viscosity at a liquidus temperature thereof is low, and it is difficult to attain stable production of the glass. For example, when a molten glass is continuously cast into a casting mold from a flow pipe, the pipe is required to have a very small diameter since the glass has a low viscosity, and as a result, the output of the glass is far lower than it is expected in an industrial level.

SUMMARY OF THE INVENTION

Under the circumstances, it is an object of the present invention to provide an optical glass that substantially does not contain any $Ta_2O_5$ and has high-refractivity low-dispersion properties and various optical parts made of the optical glass stably and at a low cost.

For achieving the above object, the present inventor has made diligent studies and as a result has found that the above object can be achieved by an optical glass having a specific glass composition and having a refractive index [nd] and an Abbe's number [vd] which satisfy specific relationships, and the present invention has been completed on the basis of the above finding.

That is, according to the present invention, there are provided;

(1) an optical glass having a glass composition comprising, by weight %, 0 to 7% of $SiO_2$, 18 to 30% of $B_2O_3$, provided that the total content of $SiO_2$ and $B_2O_3$ is 23 to 35%, 2 to 10% of ZnO, 30 to 50% of $La_2O_3$, 0 to 20% of $Gd_2O_3$, 0 to 20% of $Y_2O_3$, provided that the total content of $La_2O_3$, $Gd_2O_3$ and $Y_2O_3$ is 45 to 60%, 3 to 8% of $ZrO_2$ and 3 to 12% of $Nb_2O_5$, the total content of these components being at least 95% by weight, the optical glass having a refractive index [nd] and an Abbe's number which satisfy all of the following relational expressions, $$1.795 \leq nd \leq 1.850$$

$$41.0 \leq vd \leq 44.5$$

$$nd \geq -0.01 \times vd + 2.24,$$

(2) an optical glass recited in the above (1), wherein the glass composition contains, by weight %, 0.5 to 6% of $SiO_2$, 20 to 30% of $B_2O_3$, 2 to 8% of ZnO, 30 to 50% of $La_2O_3$, 1 to 15% of $Gd_2O_3$, 0 to 10% of $Y_2O_3$, 4 to 7% of $ZrO_2$, 4 to 10% of $Nb_2O_5$ and 0 to 1% of $Sb_2O_3$, and the total content of these components is at least 98% by weight, (3) an optical glass recited in the above (2), wherein the weight ratio of the total content of $La_2O_3$, $Gd_2O_3$ and $Y_2O_3$: the content of ZnO is from 9.5:1 to 25:1, and the weight ratio of the content of ZnO: the content of $Nb_2O_5$ is from 1:1.30 to 1:4.2, (4) an optical glass recited in the above (1), (2) or (3), which has a liquidus temperature of 1,200° C. or lower and has a viscosity of 3 dPa·s or greater at the liquidus temperature, (5) an optical glass recited in any one of the above (1) to (4), which has a glass transition temperature [Tg] of 670° C. or lower, and (6) An optical part made of the optical glass recited in any one of the above (1) to (5).

PREFERRED EMBODIMENTS OF THE INVENTION

The optical glass of the present invention has high-refractivity low-dispersion properties without substantially containing any $Ta_2O_5$, and it is also excellent in production-related properties such as devitrification resistance, glass transition temperature [Tg] and glass viscosity at liquidus temperature. It has a composition comprising, by weight %, 0 to 7% of $SiO_2$, 18 to 30% of $B_2O_3$, provided that the total content of $SiO_2$ and $B_2O_3$ is 23 to 35%, 2 to 10% of ZnO, 30 to 50% of $La_2O_3$, 0 to 20% of $Gd_2O_3$, 0 to 20% of $Y_2O_3$, provided that the total content of $La_2O_3$, $Gd_2O_3$ and $Y_2O_3$ is 45 to 60%, 3 to 8% of $ZrO_2$ and 3 to 12% of $Nb_2O_5$, and the total content of the above components is at least 95% by weight, Further, the optical glass of the present invention has a refractive index [nd] and an Abbe's number [vd] which satisfy all of the following relational expressions, $$1.795 \leq nd \leq 1.850$$

$$41.0 \leq vd \leq 44.5$$

$$nd \geq -0.01 \times vd + 2.24.$$

Figure 1:
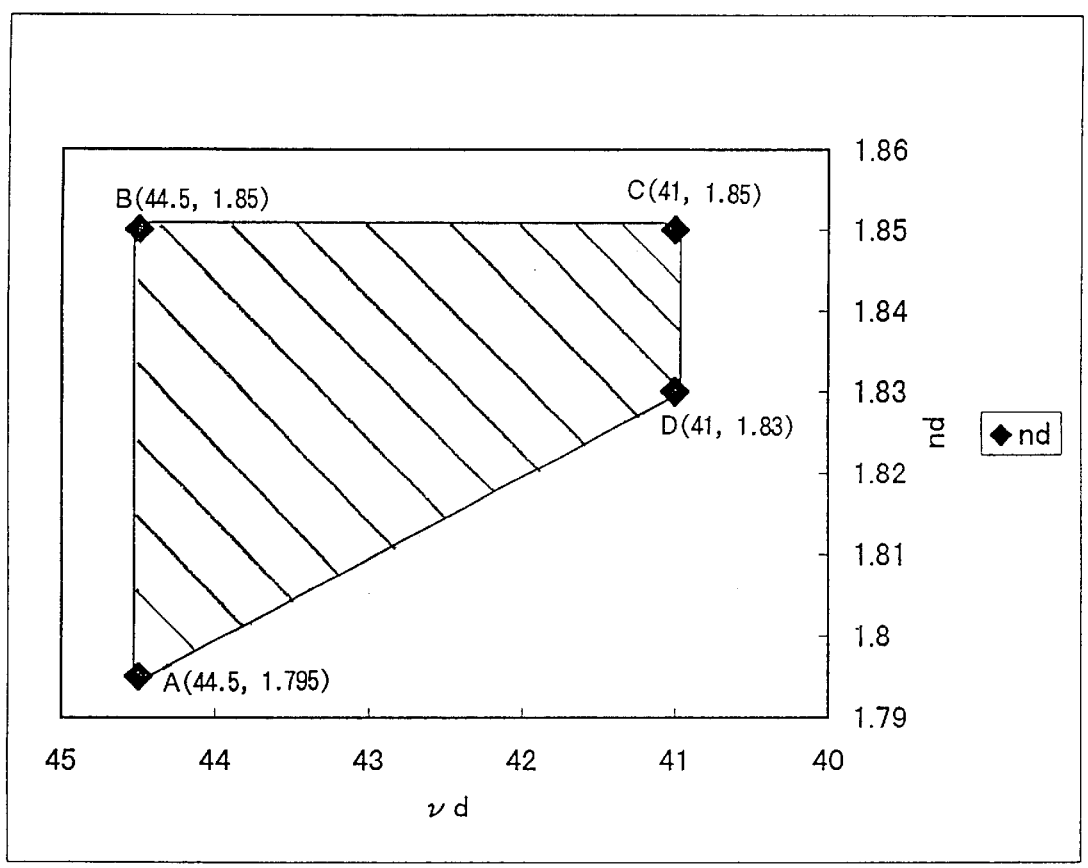
FIG. 1 is a drawing that shows a region of optical constants [Abbe's number vd and refractive index nd] of the optical glass of the present invention in X-Y coordinates in which vd is indicated by X axis and nd is indicated by Y axis.

In FIG. 1, vd and nd which satisfy the above relational expressions are present in a region (including a boundary) obtained by consecutively connecting points A (44.5, 1.795), B (44.5, 1.850), C (41.0, 1.850), D (41.0, 1.830) and A in X-Y coordinates in which vd is indicated by X axis and nd is indicated by Y axis.

The composition of the optical glass of the present invention will be explained below.

$SiO_2$ is a component for forming a network of the glass of the present invention, and the content thereof is 0 to 7% by weight. When the content of $SiO_2$ exceeds 7% by weight, the refractive index decreases, and the meltability is degraded. The content of $SiO_2$ is therefore limited to 0 to 7% by weight, and it is preferably 0.5 to 6% by weight.

$B_2O_3$ is also a component that is effective as an oxide for forming a glass network and effective for improving meltability and for decreasing the melting temperature and viscous-flow temperature of the glass, and the content thereof is required to be at least 18% by weight. When the content of $B_2O_3$ is greater than 30% by weight, however, the refractive index decreases, so that no high-refractivity glass as an end product of the present invention can be obtained. The content of $B_2O_3$ is therefore limited to 18 to 30% by weight, and it is preferably 20 to 30% by weight.

When the total content of $SiO_2$ and $B_2O_3$ is smaller than 23% by weight, the crystallization tendency is intensified, and no glass that can be stably produced is obtained. When the above total content is over 35% by weight, the refractive index decreases, so that no high-refractivity glass as an end product of the present invention can be obtained. The total content of $SiO_2$ and $B_2O_3$ is therefore limited to 23 to 30% by weight.

ZnO is an essential component that imparts the glass with high-refractivity low-dispersion properties (the dependency of the refractive index on a wavelength is small) and which improves the glass in devitrification resistance and decreases the viscous-flow temperature. The above ZnO can decrease Tg when incorporated into the glass. When the content of ZnO is smaller than 2% by weight, the devitrification increases, and the meltability of the glass is degraded. When the content of ZnO is greater than 10% by weight, the low-dispersion glass as an end product of the present invention cannot be obtained. The content of ZnO is therefore limited to 2 to 10% by weight, and it is preferably 2 to 8 parts by weight.

$La_2O_3$ is an essential component for obtaining a high-refractivity low-dispersion glass, and the content thereof is required to be 30 to 50% by weight. When the above content is less than 30% by weight, both the refractive index and the low-dispersion property decrease. When it is greater than 50% by weight, the devitrification increases, so that no glass can be stably produced. The content of $La_2O_3$ is therefore limited to 30 to 50% by weight. The content of $La_2O_3$ is preferably in the range of from 30% by weight to less than 45% by weight, more preferably in the range of from 30 to 43% by weight.

$Gd_2O_3$ can be incorporated up to 20% by weight as a substitute for some amount of $La_2O_3$. When the content thereof exceeds 20% by weight, however, the devitrification resistance is degraded, and there can be obtained no glass that can be stably produced. The content of $Gd_2O_3$ is therefore limited to 0 to 20% by weight, and it is preferably 1 to 15% by weight.

$Y_2O_3$ can be incorporated in an amount of 0 to 20% by weight as a substitute for some amount of $La_2O_3$. When the content thereof is greater than 20% by weight, the devitrification resistance is degraded, and there can be obtained no glass that can be stably produced. The content of $Y_2O_3$ is therefore limited to 0 to 20% by weight, and it is preferably 0 to 10% by weight.

All of $La_2O_3$, $Gd_2O_3$ and $Y_2O_3$ have similar effects on optical properties. When the total content of these components is smaller than 45% by weight, therefore, there cannot be obtained any high-refractivity low-dispersion properties intended in the present invention. When the above total content is greater than 60% by weight, however, the devitrification resistance decreases, and there can be obtained no glass that can be stably produced. The total content of $La_2O_3$, $Gd_2O_3$ and $Y_2O_3$ is therefore limited to 45 to 60% by weight.

$ZrO_2$ is a component for attaining a high refractive index, and it is sufficient to add a small amount of $ZrO_2$ for producing an effect on improving the glass in devitrification resistance. It is therefore sufficient to add at least 3% by weight of $ZrO_2$. However, when the content thereof is greater than 8% by weight, the devitrification resistance is rather degraded, an increase in the glass transition temperature Tg is great, and the meltability is degraded. The content of $ZrO_2$ is therefore limited to 3 to 8% by weight, and it is preferably 4 to 7% by weight.

$Nb_2O_5$ is a component for attaining a high refractive index and has properties similar to those of $Ta_2O_5$. It can be incorporated in an amount of 3 to 12% by weight. When the content of $Nb_2O_5$ is smaller than 3% by weight, the devitrification resistance is degraded, and the refractive index is decreased. When it exceeds 12% by weight, the dispersion increases, and there cannot be obtained any high-refractivity low-dispersion glass as an end product of the present invention. The content of $Nb_2O_5$ is therefore limited to 3 to 12% by weight, and it is preferably 4 to 10% by weight.

When the total content of the above components ($SiO_2$, $B_2O_3$, ZnO, $La_2O_3$, $Gd_2O_3$, $Y_2O_3$, $ZrO_2$ and $Nb_2O_5$) is smaller than 95% by weight, there cannot be obtained any glass that satisfies all of the optical properties, a decrease in viscous-flow temperature and devitrification resistance intended in the present invention. The total content of these components is therefore limited to at least 95% by weight.

The optical glass of the present invention may contain the following components in the following amounts as required in addition to the above components.

$Al_2O_3$ can adjust the optical properties (vd and nd) when added in a small amount. When the content of $Al_2O_3$ exceeds 2% by weight, however, the refractive index is decreased and the meltability is degraded. $Al_2O_3$ can be therefore incorporated in an amount range of from 0 to 2% by weight.

BaO, SrO and CaO can adjust the optical properties when added in a small amount, and they have an effect on promoting defoaming when used in the form of a carbonate or nitrate as glass raw materials. When the total content thereof is greater than 5% by weight, the devitrification resistance is degraded, and there can be obtained no glass that can be stably produced. BaO, SrO and CaO can be therefore incorporated in a total amount in the range of from 0 to 5% by weight. For producing the above effects better, it is preferred to incorporate CaO in an amount in the range of from 0 to 3% by weight.

$TiO_2$ can adjust the optical properties when added in a small amount. When the content thereof exceeds 3% by weight, the dispersion increases, absorption in a short wavelength region is intensified, and the glass intensely tends to be colored, so that the transmittance of the glass is decreased. $TiO_2$ can be therefore incorporated in an amount in the range of from 0 to 3% by weight.

$WO_3$ can adjust the optical properties when added in a small amount. When the content thereof exceeds 5% by weight, the dispersion increases, and the transmittance decreases. $WO_3$ can be therefore incorporated in an amount in the range of from 0 to 5% by weight. The content of $WO_3$ is preferably in the range of from 0 to 0.4% by weight. When the content of $WO_3$ is used in the above amount range, it is made easy to obtain a high refractive index [nd], and it is made easy to prevent the coloring of the glass. For producing the above effects, it is more preferred to incorporate no $WO_3$.

$Bi_2O_3$ can adjust the optical properties when added in a small amount. When the content thereof exceeds 3% by weight, the dispersion increases, and the transmittance decreases. $Bi_2O_3$ can be therefore incorporated in an amount in the range of from 0 to 3% by weight.

$Yb_2O_3$ can adjust the optical properties when added in a small amount. Since, however, $Yb_2O_3$ is expensive, the content of $Yb_2O_3$ is preferably in the range of from 0 to 3% by weight.

$Li_2O$ can adjust the optical properties when added in a small amount. When the content thereof exceeds 2% by weight, the devitrification resistance is decreased, and the refractive index is also decreased. $Li_2O$ can be therefore incorporated in an amount in the range of from 0 to 2% by weight. Further, $Sb_2O_3$, $SnO_2$, or the like is generally used as a clarifier, and when such a clarifier is added, it does not affect the properties of the glass so long as the content thereof does not exceed 1% by weight.

The optical glass of the present invention may contain, by weight %, 0 to 2% of $Al_2O_3$, a total of 0 to 5% of BaO, SrO and CaO, 0 to 3% of $TiO_2$, 0 to 5% of $WO_3$, 0 to 3% of $Bi_2O_3$, 0 to 3% of $Yb_2O_3$, 0 to 2% of $Li_2O$, 0 to 1% of $Sb_2O_3$ and 0 to 1% of SnO so long as the total content of these components does not exceed 5% by weight. Of the total of 0 to 5% of BaO, SrO and CaO, preferably, the content of CaO is adjusted to 0 to 3%. For environmental reasons, however, it is preferred not to incorporate PbO and radioactive substances such as $ThO_2$, and since fluorine decreases the refractive index [nd], it is preferred not to incorporate fluorine.

Of the above content range of the components of the above glass composition, the optical glass preferably has a glass composition comprising, by weight %, 0.5 to 6% of $SiO_2$, 20 to 30% of $B_2O_3$, 2 to 8% of ZnO, 30 to 50% of $La_2O_3$, 1 to 15% of $Gd_2O_3$, 0 to 10% of $Y_2O_3$, 4 to 7% of $ZrO_2$, and 4 to 10% of $Nb_2O_5$, and 0 to 1% of $Sb_2O_3$, the total content of these components being at least 98% by weight. More preferably, the total content of these components is at least 99% by weight, and particularly preferably, the total content of these components is 100% by weight. In the above content ranges of the components of the composition, the content of $La_2O_3$ is preferably from 30% by weight to less than 45% by weight, and more preferably 30 to 43% by weight.

In any one of the above content ranges of components of the glass composition, the content of $WO_3$ is preferably adjusted to 0 to 0.4% by weight, and more preferably, the optical glass contains no $WO_3$. In this case, a high refractive index [nd] can be obtained, and it is made easier to prevent the coloring of the glass. Further, desirably, the optical glass substantially does not contain any $Ta_2O_5$ from the viewpoints that the glass transition temperature [Tg] is decreased and that the cost of raw materials for the glass is decreased. That the optical glass substantially does not contain any $Ta_2O_5$ implies that $Ta_2O_5$ as an impurity may be contained.

According to the present invention, there can be obtained an optical glass having a transmittance of at least 80% (a value obtained with a 10 mm thick glass both surfaces of which are optically polished) in a visible light region that is in a wavelength region of 425 nm or greater. Thus, the optical glass of the present invention is colorless and transparent in a visible light region. When a wavelength end at which the above transmittance comes to be 80% and a wavelength end at which the above transmittance comes to be 5% are expressed as λ80/5, the λ80/5 of an optical glass having the lowest transmittance in a visible light region is 425/329 (the wavelength at which the above transmittance comes to be 80% is 425 nm and the wavelength at which the above transmittance comes to be 5% is 329 nm). Generally, the λ80/5 of the optical glass of the present invention is 410–420/315–325.

Figure 2:
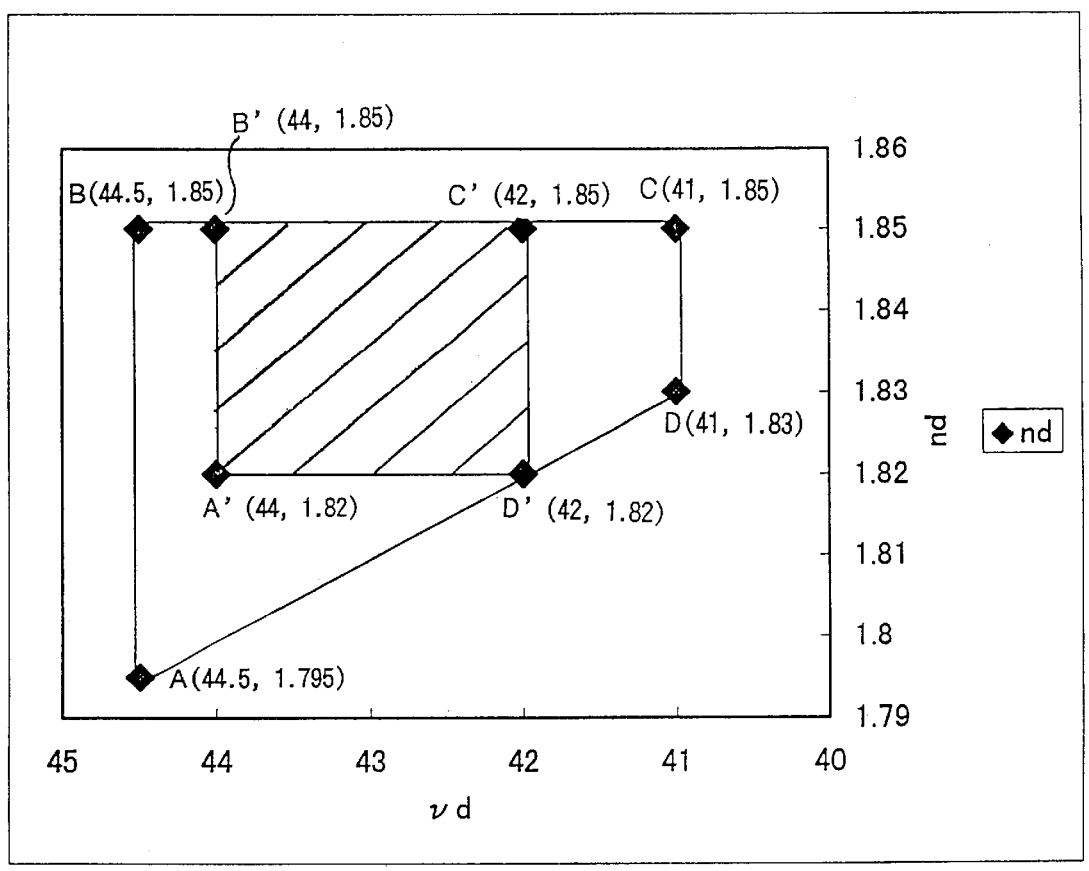
FIG. 2 is a drawing that shows a preferred region of optical constants [Abbe's number vd and refractive index nd] of the optical glass of the present invention in X-Y coordinates in which vd is indicated by X axis and nd is indicated by Y axis.

Even when the above glass composition contains no $Ta_2O_5$, there can be obtained an optical glass having optical constants including a νd in the range of from 42.0 to 44.0 and an nd in the range of from 1.820 to 1.850 by adjusting the weight ratio of the total content of $La_2O_3$, $Gd_2O_3$ and $Y_2O_3$: the content of ZnO to a range of from 9.5:1 to 25:1 and adjusting the weight ratio of the content of ZnO: content of $Nb_2O_5$ to a range of from 1:1.30 to 1:4.2. That is, in FIG. 2, the above νd and nd are present in a region (including a boundary) obtained by consecutively connecting points A' (44.0, 1.820), B' (44.0, 1.850), C' (42.0, 1.850), D' (42.0, 1.820) and A' in X-Y coordinates in which νd is indicated by X axis and nd is indicated by Y axis.

The above glass composition can give an optical glass having various glass properties required in view of production.

First, the above optical glass has a liquidus temperature of 1,200° C. or lower and a viscosity of 3 dpa·s or higher at a liquidus temperature. With the above properties, the optical glass has excellent devitrification resistance. When a glass molded article that gives the above optical glass is produced by cast-molding a molten glass, the temperature of the glass during the casting is adjusted to a liquidus temperature or a temperature a little higher than the liquidus temperature. According to the above optical glass having a viscosity of at least 3 dPa·s at a liquidus temperature, the glass has a viscosity in a proper range during the casting, so that excellent casting can be carried out.

The cast-molding method includes a method in which a molten glass that gives the above optical glass is cast into a casting mold from a flow pipe to shape the glass into a sheet-shaped glass. The casting mold has a bottom surface and a pair of sidewalls that face each other with the bottom positioned between them. The molten glass that is continuously supplied to the central portion of bottom surface of the casting mold is moved along the sidewalls, shaped and cooled to shape the glass into a sheet-shaped glass having a constant width and a constant thickness. In the above shaping method, the cast-molding is difficult if the viscosity of the glass during the casting is too low.

The sheet-shaped glass obtained by the cast-molding is cut to a plurality of pieces having nearly equal weights. The cut pieces are barrel-polished to form press-molding materials.

The thus-obtained press-molding materials made of the optical glass of the present invention are heated in atmosphere and press-molded in a plastic-deformable state with a press mold. The molding surface of the press mold is formed so as to give a molded product having a form similar to the form of an intended optical part such as a lens.

The thus-obtained press-molded product made of the optical glass of the present invention can be annealed at a relatively low temperature since the glass transition temperature [Tg] of the optical glass can be adjusted to 670° C. or lower. The annealing can be carried out at a temperature near the glass transition temperature [Tg]. Therefore, a load on a heating furnace for annealing is decreased, so that the lifetime of the heating furnace can be increased, and that the heating furnace can be operated for a longer period of time. Further, the energy consumption of the heating furnace can be decreased, so that a load on environments and the production cost can be decreased.

The annealed glass molded product is cut and polished to complete an optical part. The thus-obtained optical part made of the optical glass of the present invention includes various lenses, substrates for optical equipment and machines, diffraction gratings and prisms. The thus-obtained optical part has high-refractivity low-dispersion properties and therefore exhibits various excellent performances. Further, the optical part substantially contains no $Ta_2O_5$ and is therefore less expensive than any conventional optical part containing $Ta_2O_5$ as one of main components.

EXAMPLES

The present invention will be explained in detail with reference to Examples hereinafter, while the present invention shall not be limited by these Examples.

Examples 1–13 and Comparative Examples 1–3

Oxides, carbonates, sulfates, nitrates, hydroxides, and the like which corresponded to glass components were provided as raw materials, and the raw materials were placed in a platinum crucible so as to obtain 100 g of a glass composition shown Tables 1 to 4. The composition was melted in a furnace set at 1,320° C., stirred, clarified and cast into a frame made of iron, maintained at a temperature around Tg for 2 hours and gradually cooled to give an optical glass.

The thus-obtained optical glass was measured for optical constants (refractive index [nd] and Abbe's number [vd]) and other physical properties by the following methods. Tables 1 to 4 show the results.

(1) Refractive Index [nd] and Abbe's Number [vd]

An optical glass obtained by cooling a composition at a temperature decrease rate of 30° C./hour was measured.

(2) Liquidus Temperature [LT]

Glass samples were arranged in a platinum plate having holes having a diameter of 1 mm each, and the platinum plate was allowed to be in a gradient furnace whose temperature gradient was accurately controlled, for 30 minutes. The glass samples were cooled to room temperature and then insides of the glass samples were observed through a microscope of 100 magnifications for a crystal. A liquidus temperature was determined on the basis of a presence or absence of the crystal.

(3) Viscosity at Liquidus Temperature

Determined on the basis of a viscosity curve prepared by measuring glasses obtained in the same manner as in the above (2) with a rotational viscometer.

(4) Glass Transition Temperature [Tg]

Measured at a temperature elevation ratio of 4° C./minute with a thermomechanical analyzer.

TABLE 1

|  | Ex. 1 | Ex. 2 | Ex. 3 | Ex. 4 | Ex. 5 |
|---|---|---|---|---|---|
| Glass composition (wt. %) | | | | | |
| $SiO_2$ | 1 | 6 | 0 | 5 | 3 |
| $B_2O_3$ | 24 | 19.26 | 28.5 | 23.2 | 22.26 |
| $SiO_2 + B_2O_3$ | 25 | 25.26 | 28.5 | 28.2 | 25.26 |
| $La_2O_3$ | 40.68 | 41.15 | 38.8 | 35.2 | 41.15 |
| $Gd_2O_3$ | 12.68 | 13.15 | 12.85 | 13.15 | 13.15 |
| $Y_2O_3$ | 2.18 | 2.65 | 2.35 | 5.65 | 2.65 |
| $La_2O_3 + Gd_2O_3 + Y_2O_3$ | 55.54 | 56.95 | 54.1 | 54 | 56.95 |
| ZnO | 5.75 | 4.08 | 4.25 | 4.08 | 4.08 |
| $ZrO_2$ | 6 | 6 | 6 | 6 | 6 |
| $Nb_2O_5$ | 7.75 | 7.75 | 7.25 | 7.75 | 7.75 |
| $Ta_2O_5$ | 0 | 0 | 0 | 0 | 0 |
| $Li_2O$ | 0 | 0 | 0 | 0 | 0 |
| $WO_3$ | 0 | 0 | 0 | 0 | 0 |
| Total | 100.0 | 100.0 | 100.0 | 100.0 | 100.0 |
| Physical Properties | | | | | |
| nd | 1.83433 | 1.83328 | 1.81559 | 1.8182 | 1.83436 |
| vd | 42.72 | 42.58 | 44.08 | 43.4 | 42.68 |
| Liquidus temperature (° C.) | 1119 | 1145 | 1131 | 1138 | 1145 |
| Viscosity (dPa · s) at liquidus temp. | 4.5 | 4 | 3.5 | 4.4 | 3.6 |
| Glass transition temperature [Tg] (° C.) | 655 | 662 | 651 | 658 | 659 |

Ex. = Example

TABLE 2

|  | Ex. 6 | Ex. 7 | Ex. 8 | Ex. 9 | Ex. 10 |
|---|---|---|---|---|---|
| Glass composition (wt. %) | | | | | |
| $SiO_2$ | 1 | 2 | 1 | 4 | 1 |
| $B_2O_3$ | 25.49 | 23.26 | 26.1 | 21.26 | 25.5 |
| $SiO_2 + B_2O_3$ | 26.49 | 25.26 | 27.1 | 25.26 | 26.5 |
| $La_2O_3$ | 40.85 | 41.15 | 38.13 | 41.15 | 40.18 |
| $Gd_2O_3$ | 12.85 | 5.15 | 13.15 | 13.15 | 12.18 |
| $Y_2O_3$ | 2.35 | 10.65 | 2.65 | 2.65 | 1.68 |
| $La_2O_3 + Gd_2O_3 + Y_2O_3$ | 56.05 | 56.95 | 53.93 | 56.95 | 54.04 |
| ZnO | 2.25 | 4.08 | 3.85 | 4.08 | 4.25 |
| $ZrO_2$ | 6 | 6 | 7.4 | 6 | 4 |
| $Nb_2O_5$ | 9.25 | 6.75 | 7.75 | 7.75 | 11.25 |
| $Ta_2O_5$ | 0 | 0 | 0 | 0 | 0 |
| $Li_2O$ | 0 | 0 | 0 | 0 | 0 |
| $WO_3$ | 0 | 1 | 0 | 0 | 0 |
| Total | 100.0 | 100.0 | 100.0 | 100.0 | 100.0 |
| Physical properties | | | | | |
| nd | 1.83261 | 1.83104 | 1.82905 | 1.8339 | 1.83177 |
| vd | 42.2 | 43.1 | 43.13 | 42.61 | 41.12 |
| Liquidus temperature | 1131 | 1138 | 1145 | 1131 | 1122 |
| Viscosity (dPa · s) at liquidus temp. | 3.9 | 3.2 | 3.8 | 4.8 | 4.1 |
| Glass transition temperature [Tg] (° C.) | 670 | 658 | 652 | 663 | 655 |

Ex. = Example

TABLE 3

|  | Ex. 11 | Ex. 12 | Ex. 13 |
|---|---|---|---|
| Glass composition (wt. %) | | | |
| $SiO_2$ | 1 | 1 | 2 |
| $B_2O_3$ | 24.06 | 23.96 | 23.2 |
| $SiO_2 + B_2O_3$ | 25.06 | 24.96 | 25.2 |
| $La_2O_3$ | 41.15 | 41.15 | 41.18 |
| $Gd_2O_3$ | 13.15 | 13.15 | 13.18 |
| $Y_2O_3$ | 2.65 | 2.65 | 2.68 |
| $La_2O_3 + Gd_2O_3 + Y_2O_3$ | 56.95 | 56.95 | 57.04 |
| ZnO | 4.08 | 4.08 | 4.25 |
| $ZrO_2$ | 6.2 | 6 | 6.3 |
| $Nb_2O_5$ | 7.75 | 7.75 | 6.25 |
| $Ta_2O_5$ | 0 | 0 | 0 |
| $Li_2O$ | 0 | 0.3 | 0 |
| $WO_3$ | 0 | 0 | 1 |
| Total | 100.0 | 100.0 | 100.0 |
| Physical properties | | | |
| nd | 1.83697 | 1.83537 | 1.83182 |
| vd | 42.66 | 42.82 | 43.26 |
| Liquidus temperature (° C.) | 1122 | 1122 | 1145 |
| Viscosity (dPa·s) at liquidus temp. | 4.2 | 4.1 | 3 |
| Glass transition temperature [Tg] (° C.) | 659 | 658 | 662 |

Ex. = Example

TABLE 4

|  | CEx. 1 | CEx. 2 | CEx. 3 |
|---|---|---|---|
| Glass composition (wt. %) | | | |
| $SiO_2$ | 1 | 4 | 1 |
| $B_2O_3$ | 20.06 | 31.1 | 24.05 |
| $SiO_2 + B_2O_3$ | 21.06 | 35.1 | 25.05 |
| $La_2O_3$ | 43.15 | 34.13 | 39.69 |
| $Gd_2O_3$ | 13.15 | 8.15 | 10.78 |
| $Y_2O_3$ | 2.65 | 1.65 | 0.49 |
| $La_2O_3 + Gd_2O_3 + Y_2O_3$ | 58.95 | 43.93 | 50.96 |
| ZnO | 4.08 | 5.85 | 4 |
| $ZrO_2$ | 7.2 | 7.4 | 6 |
| $Nb_2O_5$ | 8.75 | 7.75 | 4 |
| $Ta_2O_5$ | 0 | 0 | 10 |
| $Li_2O$ | 0 | 0 | 0 |
| $WO_3$ | 0 | 0 | 0 |
| Total | 100.0 | 100.0 | 100.0 |
| Physical properties | | | |
| nd | 1.8658 | 1.77075 | 1.82779 |
| vd | 40.21 | 42.39 | 42.81 |
| Liquidus temperature (° C.) | 1151 | 1110 | 1090 |
| Viscosity (dPa·s) at liquidus temp. | 2.8 | 4.5 | 3.2 |
| Glass transition temperature [Tg] (° C.) | 668 | 647 | 687 |

CEx. = Comparative Example

Tables 1 to 4 show the following. In the glasses of the present invention shown in Examples, the optical constants (Abbe's number [vd] and refractive index [nd]) are found in a region (including boundary) surrounded by lines of from point A (44.5, 1.795)→point B (44.5, 1.850)→point C (41.0, 1.850)→point D (41.0, 1.830)→point A (44.5, 1.795), the glass transition temperature [Tg] is 630 to 670° C., the viscosity at a liquidus temperature [LT] is 3 to 13 dPa·s, and the liquidus temperature is 1,000 to 1,200° C. Further, in the glasses in Examples, the $\lambda 80/5$ were 425 or shorter/329 or shorter, and the glasses showed no coloring and were transparent.

In Comparative Example 1, the total content of $SiO_2$ and $B_2O_3$ is less than 23% by weight, so that there can be obtained no glass that is an end product in the present invention. In Comparative Example 2, the total content of $La_2O_3$, $Gd_2O_3$ and $Y_2O_3$ is smaller than 45% by weight, and the refractive index of the glass obtained is outside the refractive index intended in the present invention. In Comparative Example 3, the glass contains $Ta_2O_5$ but has a Tg of 687° C., and it is seen that there can be obtained no glass that is an end product of the present invention.

Molten glasses that give the optical glasses of Examples are cast-molded to produce sheet-shaped glasses, and the glasses are cut, whereby cut pieces can be obtained. These cut pieces have nearly equal weights and can give press-molding materials by barrel-polishing. The barrel-polishing further improves the weight accuracy and serves to round edges and corners of the cut pieces. The thus-obtained press-molding material is re-heated in atmosphere to impart it with a plastic-deformable viscous property, and press-molded with a press mold having an upper mold member and a lower mold member, whereby a glass molded article having a form similar to the form of a lens is obtained. The thus-obtained molded product is cut and polished to give a lens. The form of molding surface of the mold and the size of the press-molding material are selected as required, whereby there can be produced various lenses such as a convex lens, a concave lens and a meniscus lens. Further, while the above Examples have explained lenses as embodiments, other optical parts such as a substrate for optical equipment or an optical machine and a prism can be produced.

EFFECT OF THE INVENTION

According to the present invention, there can be stably provided an optical glass that contains no tantalum whose price fluctuation is severe and which has high-refractivity low-dispersion properties, and optical parts made of the optical glass.

Further, since the optical glass of the present invention has a low glass transition temperature [Tg] as compared with any conventional glass, so that no specially high temperature is required for annealing and re-heat pressing, which leads to stable production. Moreover, the optical glass of the present invention has a low liquidus temperature of as low as 1,200° C., and it also has devitrification resistance and has a glass viscosity of at least 3 dPa·s at a liquidus temperature, so that a glass molded article can be produced from a molten glass thereof by cast-molding.

What is claimed is:

1. An optical glass having a glass composition containing no $Ta_2O_5$ and comprising, by weight %, 0 to 7% of $SiO_2$, 18 to 30% of $B_2O_3$, provided that the total content of $SiO_2$ and $B_2 3$ is 23 to 35%, 2 to 10% of ZnO, 30 to less than 45% of $La_9O_3$, 1 to 20% of $Gd_2O_3$, 0 to 20% of $Y_2O_3$, provided that the total content of $La_2O_3$, $Gd_2O_3$ and $Y_2O_3$ is 45 to 60%, 3 to 8% of $ZrO_2$ and 3 to 12% of $Nb_2O_5$, the weight ratio of the total content of $La_2O_3$, $Gd_2O_3$ and $Y_2O_3$: the content of ZnO being 9.5:1 to 25:1, the weight ratio of the content of ZnO: the content of $Nb_2O_5$ being 1:1.30 to 1:4.2, the total content of these components being at least 95% by weight, the optical glass having a refractive index [nd] and an Abbe's number [vd] which satisfy all of the following relational expressions, $1.820 < nd \leq 1.850$ $42.0 \leq vnd \leq 44.0$.

2. An optical glass having a glass composition containing no $Ta_2O_5$ and comprising, by weight %, 0 to 7% of $SiO_2$, 18 to 30% of $B_2O_3$, provided that the total content of $SiO_2$ and $B_2O_3$ is 23 to 35%, 2 to 10% of ZnO, 30 to 50% of $La_2O_3$, 1 to 15% of $Gd_2O_3$, 0 to 20% of $Y_2O_3$, provided that the total content of $La_2O_3$, $Gd_2O_3$ and $Y_2O_3$ is 45 to 60%, 3 to 8% of $ZrO_2$ and 3 to 12% of $Nb_2O_5$, the weight ratio of the total content of $La_2O_3$, $Gd_2O_3$ and $Y_2O_3$: the content of ZnO being 9.5:1 to 25:1, the weight ratio of the content of ZnO: the content of $Nb_2O_5$ being 1:1.30 to 1:4.2, the total content of these components being at least 95 % by weight, the optical glass having a refractive index [nd] and an Abbe's number [vd] which satisfy all of the following relational expressions, $1.820 < nd \leq 1.850$ $42.0 \leq vd \leq 44.0$.

3. The optical glass of claim 1 or 2, wherein the glass composition contains, by weight %, 0.5 to 6% of $SiO_2$, 20 to 30% of $B_2O_3$, 2 to 8% of ZnO, 30 to 50% of $La_2O_3$, 1 to 15% of $Gd_2O_3$, 0 to 10% of $Y_2O_3$, 4 to 7% of $ZrO_2$, 4 to 10% of $Nb_2O_5$ and 0 to 1% of $Sb_2O_3$, and the total content of these components is at least 98% by weight.

4. The optical glass of claim 1 or 2, which has a liquidus temperature of 1,200° C. or lower and has a viscosity of 3 dPa·s or greater at the liquidus temperature.

5. The optical glass of claim 1 or 2, which has a glass transition temperature [Tg] of 670° C. or lower.

6. An optical part made of the optical glass recited in claim 1 or 2.

* * * * *